United States Patent
Ehling et al.

(10) Patent No.: US 7,387,128 B2
(45) Date of Patent: Jun. 17, 2008

(54) PRESSURE-CONDITIONING METHOD

(75) Inventors: Uwe Werner Ehling, Goldkronach (DE); Gerald Schmekel, Elmshorn (DE); Frank Plückhahn, Bayreuth (DE); Hans-Werner Fuchs, Thurnau (DE); Matthias Link, Bayreuth (DE)

(73) Assignee: British American Tobacco (Germany) GmbH, Hamburg (DE)

( * ) Notice: Subject to any disclaimer, the term of this patent is extended or adjusted under 35 U.S.C. 154(b) by 457 days.

(21) Appl. No.: 11/010,542

(22) Filed: Dec. 13, 2004

(65) Prior Publication Data

US 2005/0098186 A1    May 12, 2005

Related U.S. Application Data

(62) Division of application No. 10/772,839, filed on Feb. 5, 2004.

(30) Foreign Application Priority Data

Feb. 5, 2003    (DE) ................................ 103 04 629

(51) Int. Cl.
*A01J 13/00*    (2006.01)
*A24B 3/10*    (2006.01)

(52) U.S. Cl. ........................................ 131/297; 131/298

(58) Field of Classification Search .................. 131/297, 131/298
See application file for complete search history.

(56) References Cited

U.S. PATENT DOCUMENTS

| 3,612,066 A | * | 10/1971 | Jones et al. | ................. 131/298 |
| 5,076,293 A | * | 12/1991 | Kramer | ...................... 131/291 |
| 5,341,966 A | * | 8/1994 | Blankmeiser et al. | ....... 222/370 |

* cited by examiner

*Primary Examiner*—Carlos Lopez
(74) *Attorney, Agent, or Firm*—Charles I. Sherman; Middleton Reutlinger

(57) ABSTRACT

The invention relates to a continuous method for pressure-conditioning material for food and/or semi-luxury consumables, wherein said material (12) is introduced through an entrance (4) into a hyperbarically pressurized conditioning chamber (2), where it is treated with a conditioning agent, and extracted again from said conditioning chamber (2) at an exit (8), wherein the material (12) is conveyed continuously from said entrance (4) to said exit (8) in a conditioning chamber (2) inclined obliquely upwards, by means of a mixing conveyor, in particular a conveying screw (3). It further relates to a device for pressure-conditioning material for food and/or semi-luxury consumables, in particular for comminuted tobacco material, preferably tobacco stem material, comprising: a hyperbarically pressurized conditioning chamber (2), into which the material (12) is introduced through an entrance (4); supply nozzles (1) for treating the material (12) with a conditioning agent; and an exit (8) for extracting the material (12) from said conditioning chamber (2), wherein the conditioning chamber (2) is arranged obliquely inclined upwards and comprises a mixing conveyor, in particular a conveying screw (3), by means of which the material (12) is conveyed continuously from said entrance to said exit. It further relates to corresponding tobacco materials and smoking products.

13 Claims, 2 Drawing Sheets

PRESSURE-CONDITIONING METHOD

CROSS-REFERENCE TO RELATED APPLICATIONS

This application is a divisional patent application of, currently pending, U.S. patent application Ser. No. 10/772,839 filed Feb. 5, 2004, which claims priority to and benefit from German Patent Application Serial Number 103 04 629.1 filed on Feb. 5, 2003.

BACKGROUND OF THE INVENTION

1. Technical Field

The invention relates to a continuous method for conditioning material for food and/or semi-luxury consumables, in which the material is introduced through an entrance into a hyperbarically pressurized conditioning chamber, where it is treated with a conditioning agent, and extracted again from the conditioning chamber at an exit. In the following, this method shall be called pressure-conditioning for short. The invention further relates to a device for pressure-conditioning material for food and/or semi-luxury consumables.

The material which is pressure-conditioned in accordance with the invention can on the one hand be a tobacco material, in particular tobacco stem material, or on the other hand a granular food commodity such as for example cereals and legumes, i.e. amylaceous products such as for example maize, rice, wheat, peas and soy beans.

2. Description of the Related Art

In the field of tobacco processing, a number of proposals exist in accordance with the prior art for conditioning tobacco material, such as for example stems or strips. What is meant here by conditioning is the necessary procedural treatment of tobacco material before it is cut or also shredded. The conditioning process substantially consists of a thermotechnical treatment, so-called moistening with the media of steam, water and possibly with casing media. The process serves to make the tobacco material more resilient to the inevitable formation of small parts and dust during the comminuting process. If the tobacco material has a high entry moistness, conditioning can also mean de-moistening the tobacco.

In accordance with the standard method in accordance with the prior art, preparing stems substantially consists of moistening, accompanied by desired heating. Heated stems benefit the penetration process of the water into the interior of the stem stalks. The raw stems are thus partially moistened in a number of stages, wherein steam is sprayed in the corresponding apparatus and water is added. Furthermore, material is also stored in boxes in accordance with the prior art. These storage times can be up to 24 hours. This disadvantageously results in a large requirement of time and space for the boxes.

Conditioning is successful if the stem has a high degree of flexibility and exhibits no discernible surface moistness. Surface moistness significantly disrupts cutting, since slippery pieces of stem elude an undisrupted formation of "stem cake" in the cutting apparatus and cause hollow spaces.

Furthermore, slippery stems are more easily torn out of the stem cake while being cut by the cutting knife and thus incompletely cut. These incompletely cut stems, called knockouts, are to be avoided when cutting.

Burley stems in particular tend to form soapy surfaces. This behavior is counteracted by setting sufficient storage times. Very often, the material is rolled before being cut, which causes an improved packing structure in the cake. Rolling is also significantly disrupted by slippery stem surfaces.

In addition to the standard conditioning processes described at the beginning, other conditioning methods for tobacco material are also known. WO 99/23898, for instance, shows a plant which serves to treat and/or moisten tobacco material with casing medium, wherein the apparatus is arranged vertically, such that the tobacco material free-falls vertically from top to bottom through a pipe in which it is sprayed with the corresponding medium. Other conditioning systems in which is treated with the conditioning medium in free-fall through a chamber are known from U.S. Pat. No. 5,740,817, WO 90/06695, DE 197 34 364 A1 and DE 100 38 114 A1.

The problem which arises with the systems cited above is that a uniform and thorough penetration of moistness, such as is for example necessary for tobacco stems, cannot be optimally realized in the relatively short dwelling time of the tobacco material while it falls downwards in the conditioning chamber. While such apparatus operate quickly, they do not prepare the tobacco material as thoroughly as would be desirable.

A device for treating tobacco material is known from WO 87/07478, in which the tobacco material is introduced into a chamber, where it is transported, lying on a conveyor belt, from the entrance to the exit, while pressurized steam is supplied to the chamber. Because the tobacco material comes to rest piled up on the conveyor belt, layers lower down are disadvantageously more poorly moistened than tobacco material lying on top, which overall results in not completely satisfactory conditioning.

For a different, non-generic field of tobacco processing, namely nitrate depletion, a device is known from DE 195 35 587 C2 in which tobacco is input into an obliquely arranged casing in which a water bath is situated. A slight pressure burden prevails in the casing, and the tobacco stems are transported by means of a conveying screw from the water bath to the exit of the casing.

SUMMARY OF THE INVENTION

It is the object of the present invention to provide a pressure-conditioning method and a device to this end, which allow the material to be processed to be prepared in one stage, uniformly and thoroughly, such that once conditioned, the material is in a desired state and/or is optimally suitable for further processing. This is to be achieved in a continuous process which can be performed without storage times.

This object is solved in accordance with the invention by: a method for pressure-conditioning material for food and/or semi-luxury consumables, wherein said material is introduced through an entrance into a hyperbarically pressurized conditioning chamber, where it is treated with a conditioning agent, and extracted again from said conditioning chamber at an exit, wherein the material is conveyed continuously from said entrance to said exit in a conditioning chamber inclined obliquely upwards, by means of a mixing conveyor; and by a device for pressure-conditioning material for food and/or semi-luxury consumables, comprising: a hyperbarically pressurized conditioning chamber, into which the material is introduced through an entrance; supply nozzles for treating the material with a conditioning agent; and an exit for extracting the material from said conditioning chamber, wherein the conditioning chamber is arranged obliquely inclined upwards and comprises a mixing conveyor by means of which the material is conveyed continuously from said entrance to said exit. The sub-claims define preferred embodiments of the invention.

Regarding the method in accordance with the invention, the advantages of the present invention are based on the fact that the material is conveyed continuously from the entrance to the exit in a conditioning chamber inclined obliquely upwards, by means of a mixing conveyor, in particular a conveying screw. This very effectively blends the material, on the one hand by circulating it on the flanks of the conveying screw and on the other by the oblique inclination of the conditioning chamber, since by the effect of gravity this causes the material to always tend somewhat to fall back on the conveying path. In this way, the material can be treated very uniformly and thoroughly with the conditioning agent, and conveying the material in this way also allows the conditioning agent sufficient time to penetrate into the deeper lying sections. The method in accordance with the invention is performed at a hyperbaric pressure, whereby the conditioning medium can advantageously be used at temperatures higher than 100° C. In this way, it is possible to likewise heat the tobacco stem material higher and thus to obtain an elasticity which is suitable for the subsequent cutting process, even at lower moistness.

The dwelling time of the material in the chamber is advantageously in the range of a few minutes; it can be between about half a minute and about twelve minutes. The dwelling time can of course be adapted to the respective application.

In one embodiment of the method in accordance with the invention, the hyperbaric pressure is in the range of about 1 bar to about 11 bars.

If a hyperbaric pressure in the range of about 1 bar to about 1.5 bars is selected, then a very effective, thorough and uniform penetration of moistness can already be achieved, in particular when conditioning tobacco stems. In the range of 1.5 to 4 bars, the tobacco stem material is optimally conditioned in this way and additionally expanded, while at pressure ranges above about 4 bars, the material is conditioned, expanded and defibrated, which are all desired effects.

In accordance with a preferred embodiment of the present invention, the material is a comminuted tobacco material, in particular a tobacco stem material. Here, the invention has a particularly advantageous effect, since the correspondingly prepared stem material is cut after the conditioning process in the production sequence. However, the stems' capacity to be cut is determined by the temperature, the moistness and the resultant elasticity of the stems. Conditioning is advantageous when the stems leave the process with high particles temperatures and moderately raising moistness. This is achieved in accordance with the invention if the stems are conveyed in the conditioning chamber by means of the conveying screw and continuously pressure-conditioned, the pressure being set by supplying saturated or superheated steam. An example:

Starting from a raw stem moistness of about 7 to 10%, the stems leave the process depending on the temperature of the saturated steam, corresponding to the saturated steam pressure in accordance with the steam pressure curve as set forth in the enclosed FIG. 2 ("moistening curve"). For example, treating stems with saturated steam temperatures of 140° C. (about 3.6 bars) results in a moistening of about 20%, with respect to the base moistness.

Three other curves with different dwelling times are shown in FIG. 2. These relations in turn reflect the same processing quality, with different parameters consisting of dwelling time, tobacco temperature and tobacco moistness. Experimentally, the occurrence of dust and knockouts and the expansion result achieved were chosen as the criterion for determining the points. The additional water supply requirement can be determined from the position relative to the moistening curve. All curve points left of the moistening line require no addition of water. Areas right of the moistening curve require an addition of water, depending on the horizontal distance between the moistening curve and the dwelling time. To determine the water requirement, the initial moistness and discharge moistness have to be converted into moistness with respect to the base dryness. The difference obtained gives the water requirement in kilograms per kilogram of dry stem mass.

In accordance with the invention, the quality of the stem with respect to cutting at the point dwelling time 2 minutes, 140° C. stem temperature and 28% stem moistness is to be equated with a stem with dwelling time 1 minute, stem temperature 140° C. and a stem moistness of 36%. The advantage of the invention is evident, since stem moistness can be replaced by increased stem temperature.

Using the method in accordance with the invention, storing the material in boxes in order to achieve uniform penetration within the stems becomes superfluous. The thermal output of the dryer can nevertheless be significantly reduced, since the stems have to be cut with low moistness, which leads to savings in energy and equipment costs.

Temperatures of >100° C. can only be realized in pressurized methods.

Depending on the type of casing material, it can be advantageous to sauce the material in the conveying screw chamber (whole stem casing), in order to avoid an additional processing step.

Furthermore, it is possible to induce tobacco aging processes during the treatment and thus to achieve specific improvements in taste, with or without the addition of casing.

In the treatment of tobacco stem material in accordance with the invention, the choice of pressure range is particularly important and partially leads to surprisingly advantageous results. It may be mentioned here in advance that, in addition to cutting the conditioned tobacco material, it is also in principle possible to further process the material by shredding and/or defibrating. In the case of shredding, as opposed to cutting, the stem is defibrated by two rotating plates. One advantage of this is that defibrated stems lower the CO yield in the smoke of a cigarette as compared to cut stems, however the conventional shredding method has the disadvantage of increased formation of dust, such that high moisture ranges above 40% would have to be set. Despite these high moisture ranges, a loss of material of about 20% in the form of dust cannot be avoided. Defibrated stems would actually be advantageous, however they can conventionally only be achieved if a high formation of dust and high costs for drying prior to further processing are suffered.

In accordance with the invention, however, the tobacco material can be both conditioned, expanded and defibrated in accordance with the operational pressure in the conditioning chamber. The pressure ranges can thus be correlated with the product characteristics, as follows in Table 1:

TABLE 1

| | Pressure range | Stem characteristics | Remarks |
|---|---|---|---|
| A | >1 bar to 1.5 bars | conditioned | value ranges in |
| B | >1.5 bars to 4 bars | conditioned and expanded | pressure absolute |
| C | >4 bars | conditioned, expanded and defibrated | |

The expansion—and therefore an increase in filling capacity—of the conditioned stem in the pressure range 1.5 to 4 bars is shown in the increased diameter of the stem after treatment.

In the pressure range of >4 bars, the stem begins the process of expansion with thermal defibration. This defibration is shown in the separating off of individual fibers, wherein as of about 6 bars, the entire stem—irrespective of type—is completely defibrated. As an alternative to mechanical defibration, i.e. shredding, a material can therefore be produced which exhibits a comparable structure, without the loss of material of about 20% which otherwise has to be suffered.

The defibration may be explained by the sudden reduction in pressure which occurs when discharging the conditioned stems.

In accordance with the invention, it is advantageous to give the tobacco material a moistness of about 30% at most during conditioning, wherein a moistness of about 18% to about 30% can be advantageous. The moistness can be set depending on the application conditions.

The temperature of the material in the conditioning chamber is preferably above 100° C., in particular between 120° C. and 190° C.

The method in accordance with the invention can also be used when the material is a granular, expandable cereal or leguminous material, such that the volume of such a material is significantly increased by so-called "puffing". The cereals or legumes can thus be prepared in one stage and continuously, with a processing time in the range of a few minutes, such that puffing is enabled by the sudden release of pressure as the material leaves the conditioning chamber via a discharge sluice.

The device in accordance with the invention comprises a conditioning chamber which is arranged obliquely inclined upwards, and a mixing conveyor—in particular, a conveying screw—by means of which the material is continuously conveyed from the entrance to the exit. The advantages of the device in accordance with the invention are based on the fact that using the device, pressure-conditioning can be implemented as described above, with the correspondingly advantageous results.

In accordance with one embodiment of the device in accordance with the invention, the entrance and the exit are configured as pressure differential proof cellular wheel sluices and the conditioning chamber is configured as a pressure proof chamber, wherein the cellular wheel sluices and the chamber are pressure differential proof up to a pressure burden of at least 11 bars. This allows the corresponding pressure ratios already described above to be achieved, which advantageously enable the processed material to be conditioned, expanded and even defibrated.

The inclination of the conditioning chamber is preferably variable, in particular continuously variable, and is varied specifically in a range of >0° to 45°. Similarly, the speed of the conveying screw can be configured to be variable. This variability helps to set and optimize the dwelling time of the material in the conditioning chamber. It may be further optimized by using a conveying screw with a progressive pitch.

In accordance with a particularly preferred embodiment of the device in accordance with the invention, the flanks of the conveying screw comprise cavities through which the material can partially fall back. This falling back of the material is advantageous in two respects. On the one hand, this further improves the blending of the material, and on the other, the cavities largely preclude the possibility of tobacco material getting stuck between the inner wall of the chamber and the edge of the screw, such that the resultant operational disruptions can be avoided.

The invention further relates to a tobacco material for use in smoking products, produced using one of the methods described above or using one of the devices described above. Such a tobacco material may comprise one or more of the following materials:
 tobacco stem;
 reconstituted tobacco, in particular tobacco film and/or extruded tobacco;
 winnowings;
 tobacco leaf or lamina tobacco;
 scraps or tobacco threshing waste, in particular up to a few $cm^2$ in size;

wherein the materials are provided whole, roughly comminuted or cut to an application size.

The materials in the above list are advantageously used in the priority of their order in the list, i.e. preferably tobacco stem, and then with decreasing priority the ensuing materials. The production parameters for the tobacco material in accordance with the invention correspond to the values cited here for pressure, dwelling time, temperature, end moistness, optional casing during conditioning, etc.

A tobacco material in accordance with the invention can comprise the above-cited materials in the following proportions:
 tobacco stem at 45% at most, in particular at 25% at most, specifically at 20% at most;
 lamina tobacco at 90% at most, in particular at 50% at most, specifically at 30% at most;
 reconstituted tobacco at 40% at most, in particular at 20% at most.

The invention further relates to a smoking product which at least partially comprises tobacco material or combinations of tobacco material as described above. It can be formed as a cigarette, cigarillo or as a rolling product for self-manufacture. The tobacco material in accordance with the invention can itself also of course be used as smoking tobacco, e.g. as fine-cut tobacco, tamping tobacco, pipe tobacco, etc.

When producing smoking products or a smoking tobacco, it is not necessarily requisite to use only tobacco material in accordance with the present invention. Mixtures with other tobacco materials can also be used, e.g. stem conditioned in accordance with the method and stem not conditioned in accordance with the method, which of course does not exclude the possibility that such smoking products or tobaccos are also merely generated from mixtures of tobacco materials in accordance with the invention, e.g. from stem conditioned in accordance with the method and lamina conditioned in accordance with the method, in a blend.

In the embodiment of the invention, any of the features quoted above can be implemented in any combination.

BRIEF DESCRIPTION OF THE DRAWINGS

In the following, the invention is explained in more detail by way of example embodiments. In the drawings, there is shown.

DETAILED DESCRIPTION OF THE PREFERRED EMBODIMENTS

Figure 1:
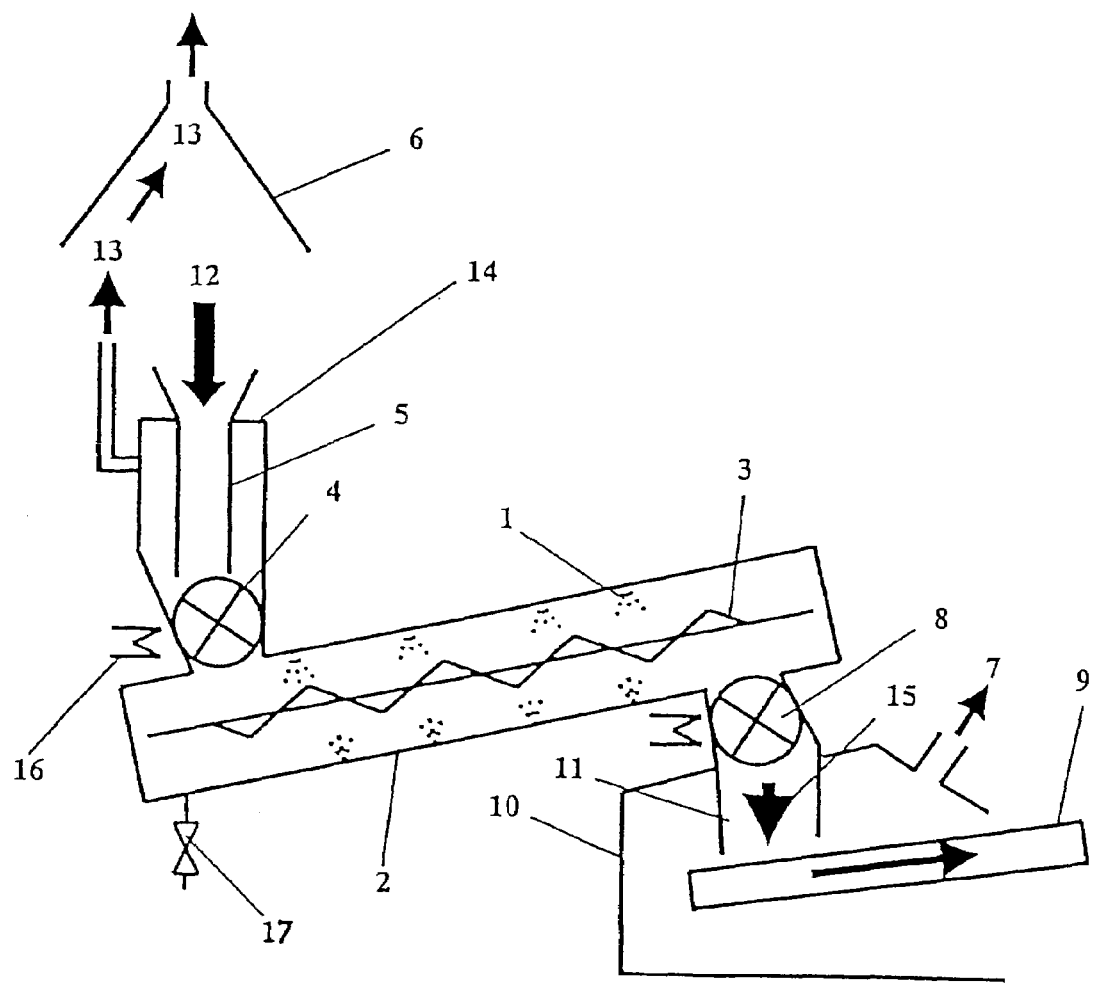
FIG. 1 is a schematic representation of a device in accordance with the invention, for pressure-conditioning tobacco stem material.
Figure 2:
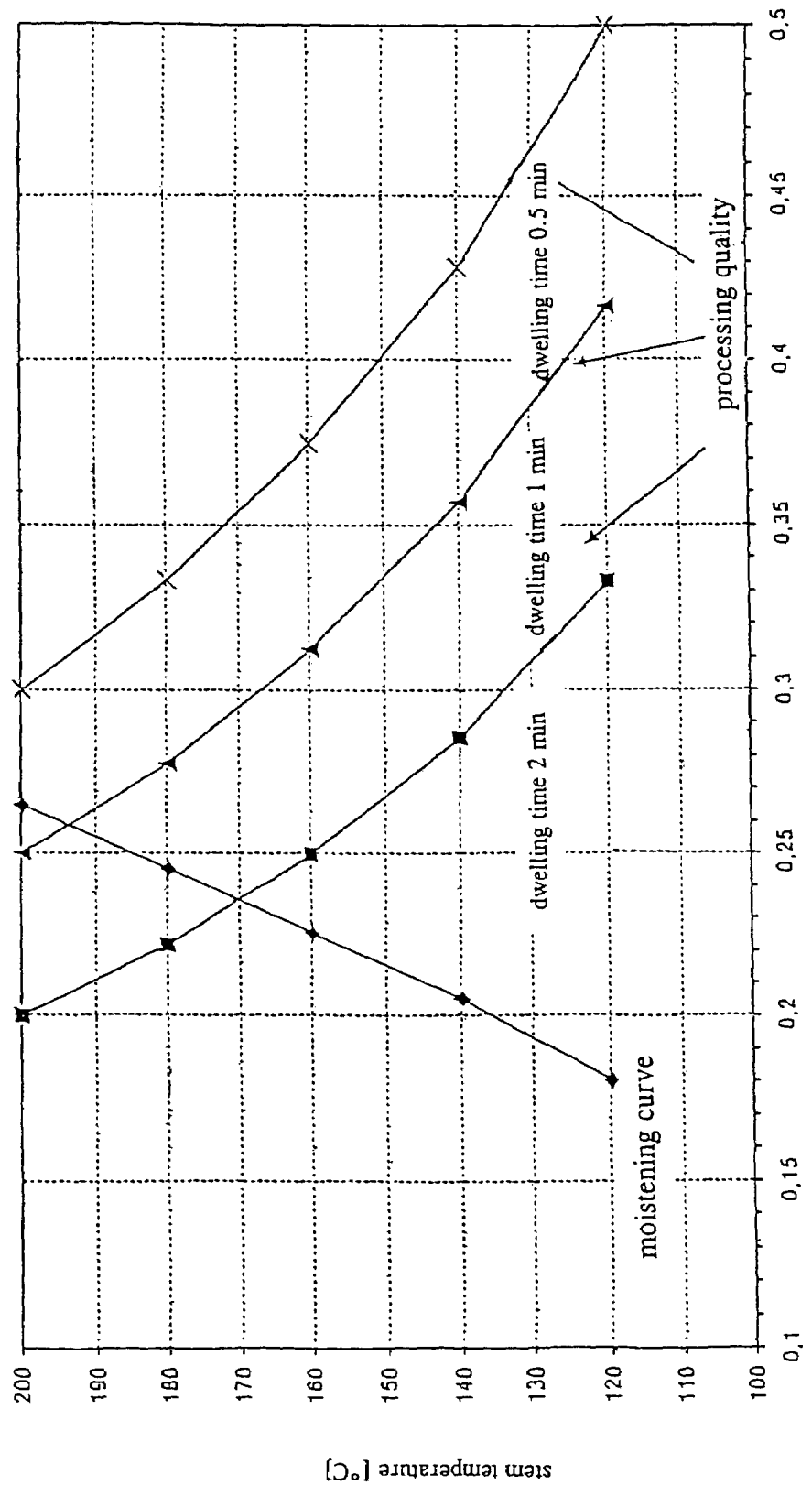
FIG. 2 is the figure described at the beginning, with "moistening curves" for tobacco stems.

In accordance with the representation in FIG. 1, the tobacco stem conditioning device in accordance with the invention comprises a pressure proof screw conveyor 2, into which the tobacco stem material 12 is introduced via a feed shoe 14 of a pressure differential proof cellular wheel sluice 14. The screw conveyor 2 comprises the conveying screw 3, likewise shown schematically only, wherein in actual practice the outer edge of the conveying screw 3 extends almost up to the inner wall of the casing of the screw conveyor 2. In the screw conveyor 2, steam and—depending on the desired end moistness of the tobacco material—also warm water are sprayed in via various nozzles 1 distributed over the circumference and length of the casing of the screw conveyor 2.

In specifically suitable cases, a casing medium can also be supplied via the nozzles 1. In the interior of the screw conveyor 2, a particular process pressure and a particular process temperature are set, depending on the steam conditions. When saturated steam is used, the respective process temperatures come out, in accordance with the steam pressure line, between 100 and 184° C., depending on the chosen process pressure, which can be between 1 and 11 bars. Temperatures above the corresponding equilibrium pressure can be achieved using superheated steam.

The screw 3, which has a progressive pitch in the direction of the discharge cellular wheel sluice 8, conveys the tobacco stem material to the likewise pressure differential proof discharge cellular wheel sluice 8 and said discharge cellular wheel sluice 8 discharges the tobacco stem material out of the screw conveyor 2. The material, which once discharged has the reference numeral 15, is then guided via a discharge shoe 11 onto a conveying means 9 and lastly leaves the steam leakage extraction hood 10.

The average dwelling time of the tobacco material in the screw conveyor 2 can be set, via the screw speed and/or the variable inclination of the screw conveyor 2, to between 30 seconds and twelve minutes. The pitch or inclination of the screw conveyor upwards can be continuously adjusted between an angle of >0° and 45°. Due to the scooping volume of the cellular wheel sluices 4, 8 and the gap between the cellular wheel rotor and the cellular wheel casing, a certain amount of steam leakage necessarily results, which escapes out of the screw conveyor 2 via the sluices and is extracted via steam extraction hoods 6 and 7. Since the steam leakage represents a loss of energy and impedes the supply of the tobacco stem material into the cellular wheel chambers, the gap between the rotor and the casing is minimized by generating an appropriate temperature difference between these two components, and the steam leakage rate thus significantly reduced. This tempering of the cellular wheel casing is indicated by the reference numeral 16; to minimize steam gaps or leakage, the cellular wheel casing is tempered via an adjusting circuit. Only in this way is it possible to maintain an appropriate pressure burden range in the process chamber, with reasonable steam leakage rates. The conditioning chamber and/or its components (screw 3, conveyor 2) can also be heated in order to avoid condensation.

The feed shoe 14 shown in FIG. 1 has the task of keeping the main steam leakage flow 13, which escapes out of the feed sluice 4, away from the tobacco material falling in, so as to ensure that the cellular wheel chambers are filled. The main steam leakage flow 13 is therefore guided laterally past the tobacco material supply shaft 5 and leaves the feed shoe 14 via a quadrant pipe towards the extraction hood 6.

In another possible embodiment, the screw conveyor 2 is fitted with various wash nozzles—not shown in FIG. 1—over its entire length. The wash water (heated or cold) can leave the screw conveyor 2, after the washing process, via the bell valve 17. This bell valve is also used when starting up the plant, to remove any condensation present.

Furthermore, it is possible to provide cleaning shutters on the casing of the screw conveyor 2, in order to make the inner space of the conveyor 2 accessible for cleaning in the event of an occlusion of tobacco material. Three cleaning shutters (not shown in FIG. 1) may for example be installed, distributed over the length of the apparatus (front third, middle and rear third).

It is likewise possible to provide cavities in the surfaces of the screw 3, which largely prevent tobacco material from getting stuck in the gap and thus prevent a drive block, and also enable the tobacco to fall back, enabling as a result an improved and more uniform blending and penetration of moistness.

By processing the tobacco material in the device shown, depending on the operational pressure in the screw conveyor, and by setting suitable parameters for plant operation and the tobacco material, the tobacco stems can be conditioned, conditioned and expanded, or even conditioned, expanded and defibrated, as already described in detail above. In the following, the results of application experiments using the device in accordance with the invention are quoted.

In the following table, Table 2, the results are shown for so-called long-stem tobacco stems, wherein the samples 1 and 2 were processed using a standard process and the samples 3 to 5 were processed using a process in accordance with the invention.

TABLE 2

| Sample | Description of the conditioning | Remarks |
|---|---|---|
| 1 | conditioning to 35% moistness plus 5 hours storage rolling, cutting with a 0.2 mm cutting width adding casing with moistening to 40% expansion STS drying to 14% moistness | standard process atmospheric conditioning admoist comparison |
| 2 | conditioning to 43% moistness plus 5 hours storage defibrating in a shredder adding casing with moistening to 45% drying to 14% moistness | standard process atmospheric conditioning admoist comparison |
| 3 | conditioning in the screw to 20% dwelling time two minutes, rolling cutting with a 0.2 mm cutting width adding casing with moistening to 25% expansion STS drying to 14% moistness | sample in accordance with the invention conditioning pressure 1.5 bars of saturated steam pressure range A in accordance with Table 1 |
| 4 | conditioning in the screw to 21% dwelling time two minutes, rolling cutting with a 0.2 mm cutting width adding casing with moistening to 25% expansion STS drying to 14% moistness | sample in accordance with the invention conditioning pressure 4 bars of saturated steam pressure range B in accordance with Table 1 |
| 5 | conditioning in the screw to 22% dwelling time two minutes, cutting with a 0.2 mm cutting width adding casing with moistening to 25% expansion STS drying to 14% moistness | sample in accordance with the invention conditioning pressure 6 bars of saturated steam pressure range C (defibrated) in accordance with Table 1 |

Table 3 shows the filling capacities of the five stem samples from Table 2:

TABLE 3

| Sample | Results | Remarks |
|---|---|---|
| 1 | filling capacity: 5.4 ml/g corrected to 12% moistness | comparison: cut |
| 2 | filling capacity: 5.6 ml/g corrected to 12% moistness | comparison: mechanically defibrated |
| 3 | filling capacity: 5.7 ml/g corrected to 12% moistness | |
| 4 | filling capacity: 6.7 ml/g corrected to 12% moistness | |
| 5 | filling capacity: 7.2 ml/g corrected to 12% moistness | thermally defibrated |

Thus, using pressure-conditioning in accordance with the invention, it is possible to cut stems having a conditioning time of just two minutes and an end moistness of 25%, and nonetheless achieves an improved filling capacity.

In the following, another example application for cereals and/or legumes is quoted in Table 4. As representatives of this group, the amylaceous products rice, maize, wheat and peas were processed, as shown in Table 4:

TABLE 4

| Sample | Sequence of the method | Remarks |
|---|---|---|
| maize | conditioning pressure 7 bars, dwelling time five minutes | the volume of all the products was significantly increased and in accordance with the known image of popcorn, puffed rice, etc. |
| rice | conditioning pressure 8 bars, dwelling time four minutes | |
| wheat | conditioning pressure 9 bars, dwelling time five minutes | |
| peas | conditioning pressure 10 bars, dwelling time six minutes | |

Thus, also with granular, amylaceous food material, it is possible to produce products with a significantly increased volume, wherein the method in accordance with the invention has the advantage of being a continuous procedure.

In the foregoing description, preferred embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A continuous method for the pressure-conditioning, expanding and defibrating of tobacco material, comprising the steps of:
   continuously introducing said tobacco material through an entrance comprising a pressure differential cellular wheel sluice structured to be pressure proofed up to a pressure burden of at least 11 bars and into a hyperbarically pressurized conditioning chamber;
   treating said material in said conditioning chamber with a conditioning agent;
      continuously extracting said material from said conditioning chamber at an exit comprising a pressure differential cellular wheel sluice structured to be pressure proofed up to a pressure burden of at least 11 bars;
   conveying the material continuously from said entrance to said exit in a an obliquely inclined said conditioning chamber, by means of a mixing screw conveyor having a progressive pitch in the direction of the said exit.

2. The method as set forth in claim 1, wherein the longest dwelling time of the material in the chamber is in the range of a few minutes.

3. The method as set forth in claim 2, said dwelling time being in the range of about half a minute to about twelve minutes.

4. The method as set forth in claim 1, wherein the hyperbaric pressure is in the range of above about 4 bars.

5. The method as set forth in claim 1, wherein said tobacco material is a comminuted tobacco material.

6. The method as set forth in claim 1, wherein said comminuted tobacco material is a tobacco stem material.

7. The method as set forth in claim 5, wherein said tobacco material has a moistness of less than 30% at most during conditioning.

8. The method as set forth in claim 5, wherein said tobacco material is given a moistness of from about 18% to about 30% during conditioning.

9. The method as set forth in claim 5, wherein the temperature of said tobacco material in the conditioning chamber is above 100° C.

10. The method as set forth claim 1, wherein the temperature of said tobacco material in the conditioning chamber is between 120° C. and 190° C.

11. The method as set forth in claim 5, wherein said tobacco material is treated with casing material.

12. The method of claim 1, wherein said treating of said tobacco material includes de-moistening or drying of said tobacco material.

13. The method of claim 12, said de-moistening or drying being carried out by means of superheated steam.

* * * * *

UNITED STATES PATENT AND TRADEMARK OFFICE
CERTIFICATE OF CORRECTION

| | | |
|---|---|---|
| PATENT NO. | : 7,387,128 B2 | Page 1 of 1 |
| APPLICATION NO. | : 11/010542 | |
| DATED | : June 17, 2008 | |
| INVENTOR(S) | : Ehling et al. | |

It is certified that error appears in the above-identified patent and that said Letters Patent is hereby corrected as shown below:

Column 10, Claim 1, line 18, delete "a".

Signed and Sealed this

Twelfth Day of October, 2010

David J. Kappos
*Director of the United States Patent and Trademark Office*